UNITED STATES PATENT OFFICE.

CHARLES LADD NORTON, OF MANCHESTER, MASSACHUSETTS.

REFRACTORY MATERIAL AND PROCESS FOR PRODUCING THE SAME.

No. 926,820.      Specification of Letters Patent.      Patented July 6, 1909.

Application filed October 15, 1908. Serial No. 457,827.

*To all whom it may concern:*

Be it known that I, CHARLES LADD NORTON, a citizen of the United States, and resident of Manchester, in the county of Essex and State of Massachusetts, have invented new and useful Improvements in Refractory Material and Processes for Producing the Same, of which the following is a specification.

My invention relates to the manufacture of sheets, blocks or other forms of heat insulating, weather resisting and electrically resistant refractory material suitable to miscellaneous protective purposes and particularly adapted for use as roofing or tiling in situations where a water and weather resisting material is desirable.

In Letters Patent of the United States numbered 847,293, granted to me March 12, 1907 I have described a refractory material composed of asbestiform fiber, and magnesium oxid hydrated by adding an appropriate amount of water to the combination, the whole compacted under heavy pressure while the hydration of the oxid was in process. I have discovered that the modification of the process described in the said patent by the addition of other ingredients, produces a refractory material different (both in kind and degree) in its physical characteristics from the refractory material described in said patent.

To produce the new and refractory material which is the subject of this specification, I proceed according to a method analogous to that described in my said patent, but employ the following ingredients in the manner hereinbelow described.

I take fine short asbestos fiber or preferably the fibers obtained by grinding and cleaning the serpentine rock in which asbestos in its normal fibrous condition is usually found in nature, and mix therewith magnesium oxid, preferably obtained by the calcination at a dull red heat of a finely comminuted magnesium carbonate, a precipitated magnesium carbonate being in my opinion the best material for this purpose by reason of the extreme fineness of its comminution; I also employ in the mixture an hydraulic cement as Portland cement, and if it be desired to render the resulting product extremely hard, strong and resistant to water, I add to the mixture a proportion of calcined silica in the form of fine sand which is mixed with the magnesium carbonate and roasted along with it. Thus the two solid ingredients are on the one hand dry, clean asbestiform fiber, and on the other hand, a dry mixture of magnesium oxid and hydraulic cement either with or without an admixture of sand. As above stated when the sand is used as an ingredient, I find it advisable to mix it with the magnesium carbonate and roast this mixture of magnesium carbonate and sand together. These two solid ingredients are then mixed together dry in proportions substantially as follows: of the asbestiform fiber 300 pounds, of the magnesium oxid and hydraulic cement 75 pounds each, and if sand is used, about 15 pounds of sand. When these ingredients are thoroughly mixed, I add thereto a weight of water substantially equal to the aggregate weight of the solid ingredients; the water so added forms with the solid ingredients a moist pulp the solids of which hold the water evenly distributed. Upon the formation of this wet pulp it is spread upon a filter bed in an hydraulic press in such quantity as is required for the formation of the desired sheet, plate, or other form of refractory material and the pulp is then subjected in the press to a pressure which preferably is between 2000 and 2500 pounds to the square inch. The operation of the filter press is to squeeze out a large proportion of the water contained in the pulp leaving therein enough water to perform the office of hydration or setting of the cementitious materials, namely the magnesium oxid and hydraulic cement. The pressure is applied while the process of hydration is going forward. Sheets or other bodies of refractory material made as aforesaid are then laid in stacks to await the final setting of the cementitious materials contained therein. Where the shape of the articles thus formed permits it, I find it to be advantageous to subject them during their secondary or final setting to a considerable pressure. This may be well accomplished by inserting between each adjacent pair of sheets a thin sheet of metal such as steel, and then pressing the stack in the hydraulic press, bringing heavy pressure to bear upon the entire stack. This pressure may advantageously be raised to 10,000 pounds to the square inch and over. During this final pressing it will be observed that very little water weeps out at the edges of the sheets of the refractory material and this slight extrusion of water is confined to the early stages of the secondary compression. The compression of the material during the secondary or final setting improves the strength, toughness and hardness of the material while it does not appreciably alter the shape or diminish the thickness of the slabs or sheets.

Sheets or other objects of refractory material composed and made as aforesaid are extremely hard, have a high tensile strength, are tough, free from laminations and proof against warping under any subsequent conditions and are susceptible of receiving a high polish. They may be used for roofing, tiling, fire-proofing etc. and also for purposes where a strong heat insulating material is desired.

What I claim and desire to secure by Letters Patent is:

1. The process of making refractory material which consists in subjecting a mixture of asbestiform fiber, magnesium oxid, hydraulic cement and water to pressure accompanied by the extrusion of surplus water while the hydration of the cementitious materials is in progress.

2. The process of making refractory material which consists in subjecting a mixture of asbestiform fiber, magnesium oxid, hydraulic cement and a silicious sand with water to pressure accompanied by the extrusion of water while the hydration of the cementitious materials is in progress.

3. The process of making refractory material which consists in roasting a mixture of magnesium carbonate and a silicious sand until the carbonate is thoroughly calcined mixing the calcined magnesium and sand with asbestiform fiber and hydraulic cement adding water to the aforesaid mixture of solids in quantities sufficient to form a wet pulp, and then subjecting the pulp to pressure while hydration of the cementitious materials is in progress expressing the surplus water and compacting the entire mass.

4. Refractory material composed of a compacted mass of uniformly distributed asbestiform fiber, magnesium oxid, and hydraulic cement.

5. Refractory material composed of asbestiform fiber, 300 parts, magnesium oxid 75 parts, hydraulic cement, 75 parts—all by weight—uniformly distributed in a compacted mass, with an amount of water in composition proportionate to the chemical requirements of the cementitious ingredients.

6. Refractory material composed of a compacted mass of uniformly distributed asbestiform fiber, magnesium oxid, and hydraulic cement and an amount of water in composition proportionate to the chemical requirements of the cementitious material.

7. Refractory material composed of a compacted mass of uniformly distributed asbestiform fiber, magnesium oxid, sand and hydraulic cement.

8. Refractory material composed of asbestiform fiber, 300 parts, magnesium oxid, 75 parts, hydraulic cement, 75 parts, sand 15 parts—all by weight—uniformly distributed in a compacted mass with an amount of water in composition proportionate to the chemical requirements of the cementitious ingredients.

9. Refractory material composed of a compacted mass of uniformly distributed asbestiform fiber, magnesium oxid, sand and hydraulic cement and an amount of water in composition proportionate to the chemical requirements of the cementitious material.

Signed by me at Boston, Massachusetts this third day of October 1908.

CHARLES LADD NORTON.

Witnesses:
CHARLES D. WOODBERRY.
ODIN ROBERTS.